(12) United States Patent
Liu

(10) Patent No.: US 11,397,349 B2
(45) Date of Patent: Jul. 26, 2022

(54) BACKLIGHT MODULE AND METHOD OF REGULATING TRANSMITTANCE THEREOF

(71) Applicant: Wuhan China Star Optoelectronics Technology Co., Ltd., Hubei (CN)

(72) Inventor: Fancheng Liu, Hubei (CN)

(73) Assignee: WUHAN CHINA STAR OPTOELECTRONICS TECHNOLOGY CO., LTD.

( * ) Notice: Subject to any disclaimer, the term of this patent is extended or adjusted under 35 U.S.C. 154(b) by 201 days.

(21) Appl. No.: 16/638,242

(22) PCT Filed: Sep. 5, 2019

(86) PCT No.: PCT/CN2019/104572
§ 371 (c)(1),
(2) Date: Feb. 11, 2020

(87) PCT Pub. No.: WO2020/258516
PCT Pub. Date: Dec. 30, 2020

(65) Prior Publication Data
US 2021/0397046 A1  Dec. 23, 2021

(30) Foreign Application Priority Data
Jun. 28, 2019 (CN) .......................... 201910573350.X

(51) Int. Cl.
*G02F 1/13357* (2006.01)
*G02F 1/1334* (2006.01)

(52) U.S. Cl.
CPC ...... *G02F 1/133603* (2013.01); *G02F 1/1334* (2013.01); *G02F 1/13345* (2021.01)

(58) Field of Classification Search
CPC .............. G02F 1/1334; G02F 1/13345; G02F 1/133603
See application file for complete search history.

(56) References Cited

U.S. PATENT DOCUMENTS

| 2017/0227816 A1 | 8/2017 | Jansen et al. |
| 2020/0183204 A1 | 6/2020 | Yoshida |

FOREIGN PATENT DOCUMENTS

| CN | 106405915 A | * | 2/2017 |
| CN | 107422529 A | * | 12/2017 |
| CN | 107422529 A | | 12/2017 |
| CN | 108761886 A | | 11/2018 |
| CN | 208110211 U | | 11/2018 |
| CN | 109119034 A | | 1/2019 |
| CN | 109254451 A | | 1/2019 |
| CN | 109709722 A | | 5/2019 |
| WO | 2019035464 A1 | | 2/2019 |

* cited by examiner

*Primary Examiner* — Jia X Pan
(74) *Attorney, Agent, or Firm* — Luedeka Neely Group, PC

(57) ABSTRACT

The present invention provides a backlight module and a method of regulating transmittance thereof. The backlight module includes: a substrate; a plurality of miniature light emitting diodes (mini-LEDs) disposed on the substrate at intervals; a polymer network liquid crystal layer disposed above the plurality of mini-LEDs, wherein the polymer network liquid crystal layer is a multilayered structure or a single-layered structure; and an optical functional layer disposed above the polymer network liquid crystal layer.

6 Claims, 5 Drawing Sheets

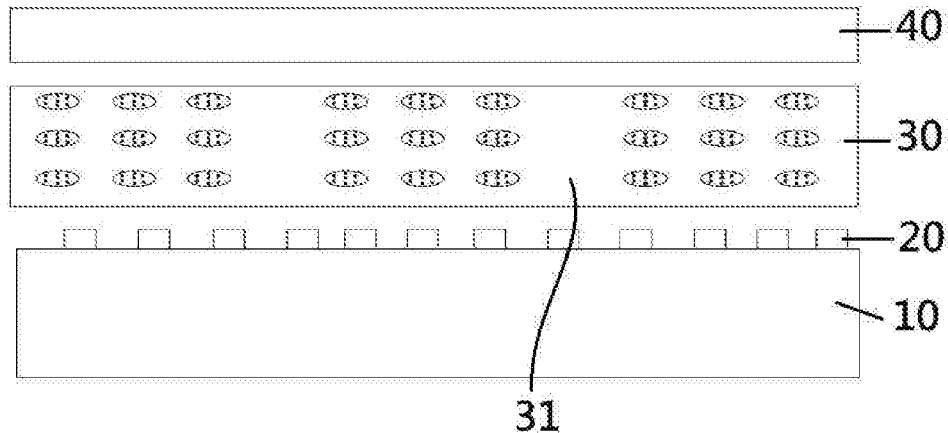

FIG. 1 providing a backlight module, including: a substrate; a plurality of miniature light emitting diodes (mini-LEDs) disposed on the substrate at intervals; a polymer network liquid crystal layer disposed above the plurality of mini-LEDs  — S10 atomizing the polymer network liquid crystal layer, including: providing a driving voltage to the polymer network liquid crystal layer, and irradiating the polymer network liquid crystal layer with ultraviolet (UV) light to cure the polymer network liquid crystal layer, such that the polymer network liquid crystal layer has an atomization structure  — S20a

FIG. 2

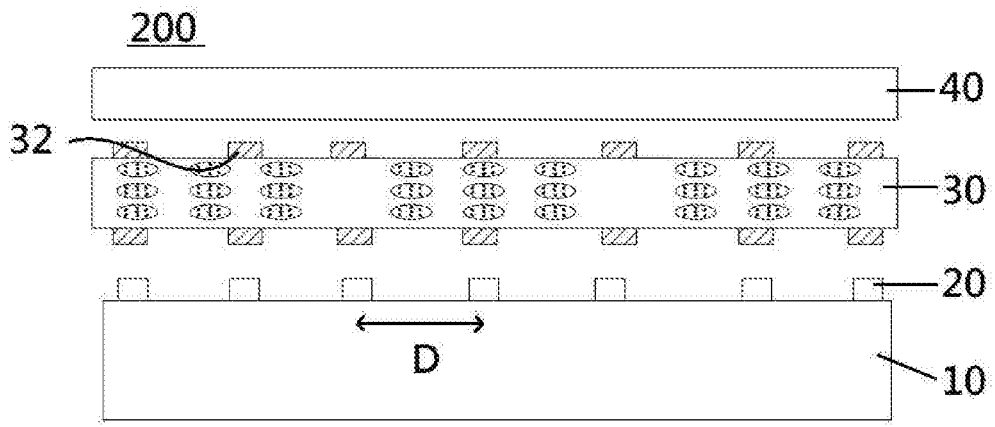

FIG. 3

```
providing a backlight module, including: a substrate;
a plurality of miniature light emitting diodes (mini-
LEDs) disposed on the substrate at intervals; a
polymer network liquid crystal layer disposed above
the plurality of mini-LEDs
```
— S10

```
patterning the polymer network liquid crystal layer,
such that the polymer network liquid crystal layer has at
least one patterned surface, wherein a pattern of the at
least one patterned surface has a pitch corresponding to
a pitch of the plurality of miniature light emitting diodes,
and the pattern correspondingly shields the plurality of
miniature light emitting diodes and exposes regions other
than the plurality of miniature light emitting diodes.
```
— S20b

FIG. 4

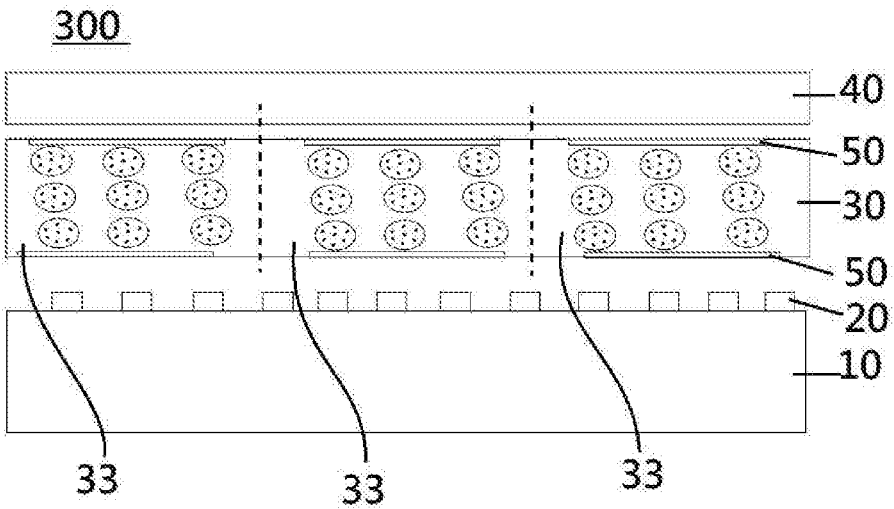

FIG. 5 providing a backlight module, including: a substrate; a plurality of miniature light emitting diodes (mini-LEDs) disposed on the substrate at intervals; a polymer network liquid crystal layer disposed above the plurality of mini-LEDs; a plurality of transparent electrodes disposed on an upper side and a lower side of the polymer network liquid crystal layer; and an optical functional layer disposed above the polymer network liquid crystal layer ～S10

⇩ dividing the polymer network liquid crystal layer into a plurality of blocks by a plurality of transparent electrodes, and providing different voltages to the plurality of transparent electrodes respectively, to continuously adjust transmittances of the plurality of blocks ～S20c

FIG. 6

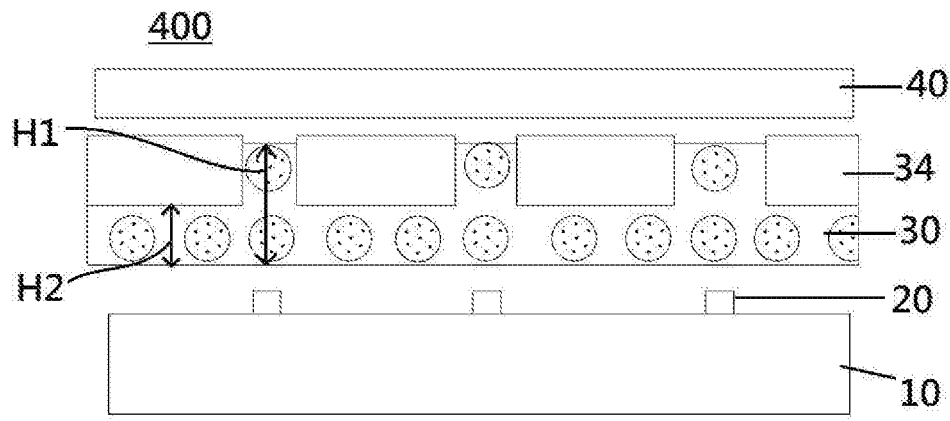

FIG. 7 providing a backlight module, including: a substrate; a plurality of miniature light emitting diodes (mini-LEDs) disposed on the substrate at intervals; a polymer network liquid crystal layer disposed above the plurality of mini-LEDs, wherein
the polymer network liquid crystal layer includes a plurality of liquid crystal empty boxes respectively corresponding to regions other than the plurality of miniature light emitting diodes, such that the polymer network liquid crystal layer corresponding to the plurality of miniature light emitting diodes has a first thickness, and the polymer network liquid crystal layer corresponding to the regions other than the plurality of miniature light emitting diodes has a second thickness, the first thickness is greater than the second thickness. As such, shielding of the plurality of mini-LEDs is enhanced by the polymer network liquid crystal layer having the first thickness to reduce transmittance, while shielding of the regions other than the plurality of miniature light emitting diodes is reduced by the polymer network liquid crystal layer having the second thickness to enhance transmittance.

BACKLIGHT MODULE AND METHOD OF REGULATING TRANSMITTANCE THEREOF

BACKGROUND OF INVENTION

Field of Invention

The present invention relates to a field of displays, in particular to a backlight module and a method of regulating transmittance thereof.

Description of Prior Art

In a direct-type miniature light-emitting diode (mini-LED) light board, light-emitting diodes (LEDs) having large pitches require a great optical distance (OD) away from the light source to shield light shadows of the LEDs. For example, when a pitch of the LEDs is greater than 2 mm, an OD of 1.0 mm-1.5 mm may be required to shield the light shadows of LEDs.

A large OD will cause difficulty in module design, resulting in poor structural stability of the liquid crystal display module (LCM). Moreover, because a thickness of a diffusion plate changes discontinuously, a redundant OD design may occur in, for example, a conventional diffusion plate (having thicknesses of 0.8-1.0-1.2-1.5), thereby increasing the overall thickness of the liquid crystal display module.

There is an urgent need for a backlight module that realizes a continuously adjustable transmittance in a liquid crystal display module using miniature light emitting diodes (mini-LEDs). When the pitches between the light emitting diodes are different, there is no need to change an optical distance (OD), and it is not necessary to change an overall thickness of the liquid crystal display module. What is the only need is to regulate transmittance of a polymer network liquid crystal (PNLC) film to provide shielding in different degrees.

SUMMARY OF INVENTION

In view of the above, the present invention provides a novel backlight module and a method of regulating transmittance thereof, and realizes a continuously adjustable optical distance (OD) between a light source and a film in a liquid crystal display module using miniature light emitting diodes (mini-LEDs). When the pitches between the light emitting diodes are different, there is no need to change an optical distance (OD), and it is not necessary to change an overall thickness of the liquid crystal display module, What is the only need is to regulate transmittance of a polymer network liquid crystal (PNLC) film to provide shielding in different degrees, such that a backlight module with a small OD is obtained, the overall thickness of the display is reduced, and structural stability of the module design is improved.

Accordingly, in accordance with an embodiment of the present invention, the present invention provides a backlight module including: a substrate; a plurality of miniature light emitting diodes (mini-LEDs) disposed on the substrate at intervals; a polymer network liquid crystal layer disposed above the plurality of mini-LEDs, wherein the polymer network liquid crystal layer is a multilayered structure or a single-layered structure; and an optical functional layer disposed above the polymer network liquid crystal layer.

According to an embodiment of the present invention, the polymer network liquid crystal layer includes a patterned upper surface and/or a patterned lower surface corresponding to the plurality of miniature light emitting diodes.

According to an embodiment of the present invention, the polymer network liquid crystal layer includes a plurality of liquid crystal empty boxes respectively corresponding to regions other than the plurality of miniature light emitting diodes, such that the polymer network liquid crystal layer corresponding to the plurality of miniature light emitting diodes has a first thickness, and the polymer network liquid crystal layer corresponding to the regions other than the plurality of miniature light emitting diodes has a second thickness, the first thickness is greater than the second thickness.

According to an embodiment of the present invention, the optical functional layer is a multilayered structure or a single-layered structure, and the optical functional layer includes a brightness enhancement film.

According to still another embodiment of the present invention, the present invention further provides a method of regulating transmittance of a backlight module, including the following steps: S10 providing a backlight module, including: a substrate; a plurality of miniature light emitting diodes (mini-LEDs) disposed on the substrate at intervals; a polymer network liquid crystal layer disposed above the plurality of mini-LEDs, wherein the polymer network liquid crystal layer is a multilayered structure or a single-layered structure; and an optical functional layer disposed above the polymer network liquid crystal layer.

According to an embodiment of the present invention, the method of regulating the transmittance of the backlight module further includes:

S20a atomizing the polymer network liquid crystal layer, including: providing a driving voltage to the polymer network liquid crystal layer, and irradiating the polymer network liquid crystal layer with ultraviolet (UV) light to cure the polymer network liquid crystal layer, such that the polymer network liquid crystal layer has an atomization structure.

According to an embodiment of the present invention, the method of regulating the transmittance of the backlight module further includes:

S20b patterning the polymer network liquid crystal layer, such that the polymer network liquid crystal layer has at least one patterned surface, wherein a pattern of the at least one patterned surface has a pitch corresponding to a pitch of the plurality of miniature light emitting diodes, and the pattern correspondingly shields the plurality of miniature light emitting diodes and exposes regions other than the plurality of miniature light emitting diodes.

According to an embodiment of the present invention, in the step 10, the backlight module further includes: a plurality of transparent electrodes disposed on an upper side and a lower side of the polymer network liquid crystal layer, and the method of regulating the transmittance of the backlight module further include:

S20c dividing the polymer network liquid crystal layer into a plurality of blocks by a plurality of transparent electrodes, and providing different voltages to the plurality of transparent electrodes respectively, to continuously adjust transmittances of the plurality of blocks.

According to an embodiment of the present invention, in the step 10, the polymer network liquid crystal layer includes a plurality of liquid crystal empty boxes respectively corresponding to regions other than the plurality of miniature light emitting diodes, such that the polymer network liquid crystal layer corresponding to the plurality of miniature light emitting diodes has a first thickness, and the polymer network liquid crystal layer corresponding to the regions other than the plurality of miniature light emitting diodes has a second thickness, the first thickness is greater than the second thickness. As such, shielding of the plurality of mini-LEDs is enhanced by the polymer network liquid crystal layer having the first thickness to reduce transmittance, while shielding of the regions other than the plurality of miniature light emitting diodes is reduced by the polymer network liquid crystal layer having the second thickness to enhance transmittance.

Another embodiment of the present invention also provides a display including the backlight module.

The present invention provides a novel backlight module and a method of regulating transmittance thereof, and realizes a continuously adjustable optical distance (OD) between a light source and a film in a liquid crystal display module using miniature light emitting diodes (mini-LEDs). When the pitches between the light emitting diodes are different, there is no need to change an optical distance (OD), and it is not necessary to change an overall thickness of the liquid crystal display module, What is the only need is to regulate transmittance of a polymer network liquid crystal (PNLC) film to provide shielding in different degrees, such that a backlight module with a small OD is obtained, the overall thickness of the display is reduced, and structural stability of the module design is improved.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

FIG. 1 is a schematic diagram of a backlight module in accordance with a first embodiment of the present invention.

FIG. 2 is a flow chart of a method of regulating transmittance of a backlight module according to the first embodiment of the present invention.

FIG. 3 is a schematic diagram of a backlight module according to a second embodiment of the present invention.

FIG. 4 is a flow chart of a method of regulating transmittance of a backlight module according to the second embodiment of the present invention.

FIG. 5 is a schematic diagram of a backlight module according to a third embodiment of the present invention.

FIG. 6 is a flow chart of a method of regulating transmittance of a backlight module according to the third embodiment of the present invention.

FIG. 7 is a schematic diagram of a backlight module according to a fourth embodiment of the present invention.

FIG. 8 is a flow chart of a method of regulating transmittance of a backlight module according to the fourth embodiment of the present invention.

DETAILED DESCRIPTION OF PREFERRED EMBODIMENTS

Figure 9:
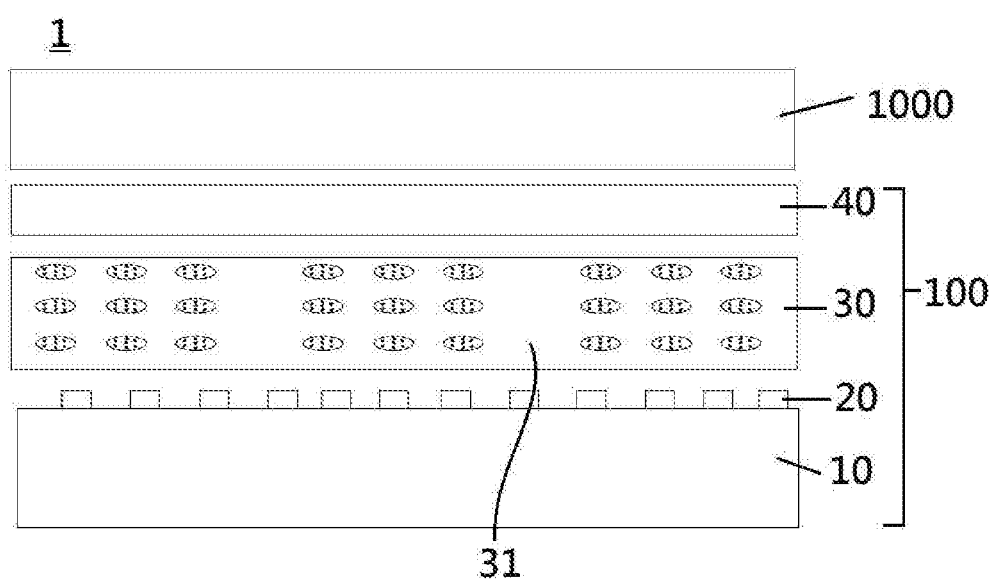
FIG. 9 is a schematic diagram of a display in accordance with an embodiment of the present invention.

In order to make the above description of the present invention more comprehensible, the preferred embodiments are described below in detail with reference to the accompanying drawings.

The following description of the various embodiments is provided to illustrate the specific embodiments of the invention. The spatially relative directional terms mentioned in the present invention, such as "vertical", "horizontal", "upper", "lower", "before", "after", "left", "right", "inside", "outside", "side", etc. and the like, may be used herein for ease of description to describe one element or feature's relationship to another element(s) or feature(s) as illustrated in the figures which are merely references. The spatially relative terms are intended to encompass different orientations in addition to the orientation as depicted in the figures.

In order to solve the problem of prior art, the present invention provides a novel backlight module and a method of regulating transmittance thereof, and realizes a continuously adjustable optical distance (OD) between a light source and a film in a liquid crystal display module using miniature light emitting diodes (mini-LEDs). When the pitches between the light emitting diodes are different, there is no need to change an optical distance (OD), and it is not necessary to change an overall thickness of the liquid crystal display module, What is the only need is to regulate transmittance of a polymer network liquid crystal (PNLC) film to provide shielding in different degrees, such that a backlight module with a small OD is obtained, the overall thickness of the display is reduced, and structural stability of the module design is improved.

First Embodiment

In the first embodiment of the present invention, a single-layered or a multilayered polymer network liquid crystal (PNLC) film is used as an alternative of a diffusion film or a diffusion plate in a backlight module of a conventional liquid crystal display module.

FIG. 1 is a schematic diagram of a backlight module in accordance with the first embodiment of the present invention. FIG. 2 is a flow chart of a method of regulating transmittance of a backlight module according to the first embodiment of the present invention. Referring to FIG. 1 and FIG. 2, in particular, the method of regulating the transmittance of the backlight module 100 provided by the present invention includes the following steps:

S10 providing a backlight module 100, including: a substrate 10; a plurality of miniature light emitting diodes (mini-LEDs) 20 disposed on the substrate 10 at intervals; a polymer network liquid crystal layer 30 disposed above the plurality of mini-LEDs 20, wherein the polymer network liquid crystal layer 30 is a multilayered structure or a single-layered structure; and an optical functional layer 40 is disposed above the polymer network liquid crystal layer 30, as shown in FIG. 1.

S20a atomizing the polymer network liquid crystal layer 30, including: providing a driving voltage to the polymer network liquid crystal layer 30, and irradiating the polymer network liquid crystal layer 30 with ultraviolet (UV) light to cure the polymer network liquid crystal layer 30, such that the polymer network liquid crystal layer 30 has an atomization structure 31.

Second Embodiment

The second embodiment of the present invention is substantially the same as the first embodiment, except that the second embodiment of the present invention provides a polymer network liquid crystal layer with a patterned surface by a haze treatment, thereby minimizing loss of transmittance while increasing shielding.

FIG. 3 is a schematic diagram of a backlight module 200 according to the second embodiment of the present invention. FIG. 4 is a flow chart of a method of regulating transmittance of a backlight module 200 according to the second embodiment of the present invention. Referring to FIG. 3 and FIG. 4, in particular, the method of regulating the transmittance of the backlight module 200 of the present invention includes the following steps:

S10 providing a backlight module 200, including: a substrate 10; a plurality of miniature light emitting diodes (mini-LEDs) 20 disposed on the substrate 10 at intervals; a polymer network liquid crystal layer 30 disposed above the plurality of mini-LEDs 20; and an optical functional layer 40 disposed above the polymer network liquid crystal layer 30, as shown in FIG. 3.

S20b patterning the polymer network liquid crystal layer 30, such that the polymer network liquid crystal layer 30 has at least one patterned surface, wherein a pattern of the at least one patterned surface has a pitch D corresponding to a pitch D of the plurality of miniature light emitting diodes 20, and the pattern correspondingly shields the plurality of miniature light emitting diodes 20 and exposes regions other than the plurality of miniature light emitting diodes 20.

In this embodiment, the polymer network liquid crystal layer 30 may have one patterned surface or have opposite two patterned surfaces.

Third Embodiment

The third embodiment of the present invention is substantially the same as the first embodiment, except that the third embodiment of the present invention has a plurality of transparent electrodes 50 disposed on an upper side and a lower side of the polymer network liquid crystal layer 30, and the polymer network liquid crystal layer 30 is divided into a plurality of blocks by the plurality of transparent electrodes 50, thereby continuously regulating transmittance of the plurality of blocks respectively.

FIG. 5 is a schematic diagram of a backlight module 300 according to the third embodiment of the present invention. FIG. 6 is a flow chart of a method of regulating transmittance of a backlight module 300 according to the third embodiment of the present invention. Referring to FIG. 5 and FIG. 6, in particular, the method of regulating the transmittance of the backlight module 300 of the present invention includes the following steps:

S10 providing a backlight module 300, including: a substrate 10; a plurality of miniature light emitting diodes (mini-LEDs) 20 disposed on the substrate 10 at intervals; a polymer network liquid crystal layer 30 disposed above the plurality of mini-LEDs 20; a plurality of transparent electrodes 50 disposed on an upper side and a lower side of the polymer network liquid crystal layer 30; and an optical functional layer 40 disposed above the polymer network liquid crystal layer 30, as shown in FIG. 5.

S20c dividing the polymer network liquid crystal layer 30 into a plurality of blocks 33 by a plurality of transparent electrodes 50, and providing different voltages to the plurality of transparent electrodes 50 respectively, to continuously adjust transmittances of the plurality of blocks 33.

Fourth Embodiment

The fourth embodiment of the present invention is substantially the same as the first embodiment, except that the fourth embodiment of the present invention utilizes a design of dual thicknesses of patterned liquid crystal cells, to make the polymer network liquid crystal layer have an enhanced diffusibility and a decreased transmittance at a region of a large thickness, thereby improving the shielding at the region of the large thickness.

FIG. 7 is a schematic diagram of a backlight module 400 according to the fourth embodiment of the present invention. FIG. 8 is a flow chart of a method of regulating transmittance of a backlight module 400 according to the fourth embodiment of the present invention. Referring to FIG. 7 and FIG. 8, in particular, the method of regulating the transmittance of the backlight module 400 of the present invention includes the following steps:

S10 providing a backlight module 400, including: a substrate 10; a plurality of miniature light emitting diodes (mini-LEDs) 20 disposed on the substrate 10 at intervals; a polymer network liquid crystal layer 30 disposed above the plurality of mini-LEDs 20; and an optical functional layer 40 disposed above the polymer network liquid crystal layer 30, as shown in FIG. 7.

In this embodiment, the polymer network liquid crystal layer 30 includes a plurality of liquid crystal empty boxes 34 respectively corresponding to regions other than the plurality of miniature light emitting diodes 20, such that the polymer network liquid crystal layer 30 corresponding to the plurality of miniature light emitting diodes 20 has a first thickness H1, and the polymer network liquid crystal layer 30 corresponding to the regions other than the plurality of miniature light emitting diodes 20 has a second thickness H2, wherein the first thickness H1 is greater than the second thickness H2. Shielding of the plurality of mini-LEDs is enhanced by the polymer network liquid crystal layer 30 having the first thickness H1 to reduce transmittance, while shielding of the regions other than the plurality of miniature light emitting diodes 20 is reduced by the polymer network liquid crystal layer 30 having the second thickness H2 to enhance transmittance In the above various embodiments, the optical functional layer 40 and the polymer network liquid crystal layer 30 may each independently be a multilayered structure or a single-layered structure.

In various embodiments described above, the optical functional layer 40 can include a brightness enhancing film.

FIG. 9 is a schematic diagram of a display in accordance with an embodiment of the present invention. Referring to FIG. 9, another embodiment of the present invention further provides a display 1 including the backlight module 100 and a display screen 1000 disposed on the backlight module 100.

According to other embodiments of the present invention, the backlight module of the display 1 may be selected from one of the backlight module 100, the backlight module 200, the backlight module 300, the backlight module 400, and combinations thereof (not shown).

According to various embodiments disclosed in the present invention, the backlight module and the method of regulating the transmittance thereof provided by the present invention can realizes a continuously adjustable optical distance (OD) between a light source and a film in a liquid crystal display module using miniature light emitting diodes (mini-LEDs). When the pitches between the light emitting diodes are different, there is no need to change an optical distance (OD), and it is not necessary to change an overall thickness of the liquid crystal display module, What is the only need is to regulate transmittance of a polymer network liquid crystal (PNLC) film to provide shielding in different degrees, such that a backlight module with a small OD is obtained, the overall thickness of the display is reduced, and structural stability of the module design is improved.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A backlight module, comprising:
   a substrate;
   a plurality of miniature light emitting diodes (mini-LEDs) disposed on the substrate at intervals;
   a polymer network liquid crystal layer disposed above the plurality of mini-LEDs, wherein the polymer network liquid crystal layer is a multilayered structure or a single-layered structure; and
   an optical functional layer disposed above the polymer network liquid crystal layer,
   wherein the polymer network liquid crystal layer comprises a plurality of liquid crystal empty boxes respectively corresponding to regions other than the plurality of miniature light emitting diodes, such that the polymer network liquid crystal layer corresponding to the plurality of miniature light emitting diodes has a first thickness, and the polymer network liquid crystal layer corresponding to the regions other than the plurality of miniature light emitting diodes has a second thickness, the first thickness is greater than the second thickness.

2. The backlight module according to claim 1, wherein the optical functional layer is a multilayered structure or a single-layered structure, and the optical functional layer comprises a brightness enhancement film.

3. A display, comprising the backlight module according to claim 1.

4. A method of regulating transmittance of a backlight module, comprising the following steps:
   S10 providing a backlight module, comprising:
   a substrate;
   a plurality of miniature light emitting diodes (mini-LEDs) disposed on the substrate at intervals;
   a polymer network liquid crystal layer disposed above the plurality of mini-LEDs, wherein the polymer network liquid crystal layer is a multilayered structure or a single-layered structure; and
   an optical functional layer disposed above the polymer network liquid crystal layer,
   wherein in the step S10, the polymer network liquid crystal layer comprises a plurality of liquid crystal empty boxes respectively corresponding to regions other than the plurality of miniature light emitting diodes, such that the polymer network liquid crystal layer corresponding to the plurality of miniature light emitting diodes has a first thickness, and the polymer network liquid crystal layer corresponding to the regions other than the plurality of miniature light emitting diodes has a second thickness, the first thickness is greater than the second thickness.

5. The method of regulating the transmittance of the backlight module according to claim 4, wherein the method further comprises:
   S20a atomizing the polymer network liquid crystal layer, comprising: providing a driving voltage to the polymer network liquid crystal layer, and irradiating the polymer network liquid crystal layer with ultraviolet (UV) light to cure the polymer network liquid crystal layer, such that the polymer network liquid crystal layer has an atomization structure.

6. The method of regulating the transmittance of the backlight module according to claim 4, wherein in step S10, shielding of the plurality of mini-LEDs is enhanced by the polymer network liquid crystal layer having the first thickness to reduce transmittance, while shielding of the regions other than the plurality of miniature light emitting diodes is reduced by the polymer network liquid crystal layer having the second thickness to enhance transmittance.

* * * * *